United States Patent [19]
Secord et al.

[11] Patent Number: 6,097,712
[45] Date of Patent: Aug. 1, 2000

[54] MULTI-CARRIER CDMA COMMUNICATIONS SYSTEMS

[75] Inventors: Norman P. Secord; Leo Strawczynski, both of Ottawa, Canada; Alberto Gutierrez; Ahmad Jalali, both of Plano, Tex.

[73] Assignee: Nortel Networks Limited, Montreal, Canada

[21] Appl. No.: 08/879,773

[22] Filed: Jun. 20, 1997

[51] Int. Cl.[7] .............................. H04B 7/216; H04L 27/30
[52] U.S. Cl. ............................................. 370/335; 375/140
[58] Field of Search .................................... 370/335, 329, 370/320, 441, 479, 342, 480, 481, 328, 208, 209; 375/200, 140, 260; 455/17

[56] References Cited

U.S. PATENT DOCUMENTS

| | | | |
|---|---|---|---|
| 5,521,937 | 5/1996 | Kondo et al. | 375/206 |
| 5,551,070 | 8/1996 | Skarby et al. | 455/126 |
| 5,678,213 | 10/1997 | Myer | 455/209 |
| 5,680,388 | 10/1997 | Kahre | 370/210 |
| 5,790,549 | 8/1998 | Dent | 370/479 |
| 5,872,775 | 2/1999 | Saints et al. | 370/342 |
| 5,930,288 | 7/1999 | Eberhardt | 375/200 |

*Primary Examiner*—Ajit Patel
*Assistant Examiner*—Brian Nguyen
*Attorney, Agent, or Firm*—Foley & Lardner

[57] ABSTRACT

In a receiver of a simulcast multi-carrier CDMA (code division multiple access) communications system, a combined data signal is produced by combining signals representing data received for the plurality of carriers and is multiplied by the complex conjugate of a composite reference signal, representing characteristics of the plurality of carriers, produced by combining signals representing a reference signal received for the plurality of carriers, thereby improving multi-path resolution due to frequency diversity of the reference signal over the multiple carriers of the system. The receiver can be simplified by demodulating the signals of the plurality of carriers in common to produce a demodulated signal which is common to the data and reference signals for the plurality of carriers, the data and reference signals being subsequently separated using their respective orthogonal codes. Data signals can be recovered both with and without the improved multi-path resolution over the multiple carriers, and an optimum selection between them can be made.

11 Claims, 3 Drawing Sheets

MULTI-CARRIER CDMA COMMUNICATIONS SYSTEMS

This invention relates to multi-carrier CDMA (code division multiple access) communications systems, and is particularly concerned with receivers and transmitters in such systems using so-called simulcast communications in which the same data is carried by all of the carriers. The terms multi-carrier and multiple carriers in the context of such systems and this invention embrace two or more carriers, and the term data is used to embrace any kind of information.

BACKGROUND OF THE INVENTION

In a multi-carrier CDMA communications system, two or more direct sequence CDMA signals are used to communicate information over a communications channel. With simulcast communications, the same information or data is communicated using all of the carrier frequencies, and it can be shown that the frequency diversity which is consequently provided is equivalent to direct spreading of the signal over the bandwidth occupied by the multiple carriers. The use of multiple carriers in a multi-carrier system can provide compatibility with existing systems; for example the bandwidth of each of the multiple carriers can be the same as the bandwidth of a single carrier in an existing CDMA communications system. Thus, the multi-carrier CDMA system can be overlayed with and can share the same spectrum as one or more single carrier CDMA systems, preserving many of the beneficial features of the single carrier system such as the orthogonality of code signals.

It is also desirable to obtain the advantage of the frequency diversity of the multiple carriers of the multi-carrier system for multi-path resolution at the receiver of the system, rather than this resolution being limited to that provided by the RAKE receiver operating on an individual carrier. An object of this invention is to facilitate providing this advantage.

SUMMARY OF THE INVENTION

One aspect of this invention provides a method of combining signals in a receiver of a CDMA (code division multiple access) communications system in which signals for each of a plurality of carriers of the system are combined, comprising the steps of: combining signals representing data received for the plurality of carriers to produce a combined data signal; combining signals representing a reference signal received for the plurality of carriers to produce a composite reference signal representing characteristics of the plurality of carriers; and deriving a received data signal from the combined data signal and the composite reference signal.

The steps of combining signals representing data and combining signals representing a reference signal for the plurality of carriers can be carried out commonly before subsequent steps of despreading using a common code for the plurality of carriers and separating the data and reference signals using respective orthogonal code sequences.

The method can further comprise the steps of: deriving a received signal individually for each of the plurality of carriers from a signal representing data received for the respective carrier and a signal representing the reference signal received for the respective carrier; combining the received signals for the plurality of carriers to produce a second received data signal; and selecting an output signal from the received data signal and the second received data signal.

The step of deriving the received data signal can comprise multiplying the combined data signal by the complex conjugate of the composite reference signal.

Another aspect of this invention provides a method of combining signals representing data received for a plurality of carriers in a multi-carrier CDMA (code division multiple access) communications system in which data signals are derived from received signals using a reference signal also communicated via the plurality of carriers, characterised in that signals representing the reference signal received via the plurality of carriers are combined to produce a composite reference signal representing characteristics of the plurality of carriers for deriving the data signals.

The signals representing data and the signals representing the reference signal can conveniently be combined in common for the plurality of carriers and are separated using orthogonal code sequences.

The invention also provides a CDMA (code division multiple access) receiver comprising: means for demodulating signals of a plurality of carriers each of which serves to communicate a reference signal and at least one data signal using respective orthogonal code sequences; means responsive to a respective orthogonal code sequence for producing from the demodulated signals for the plurality of carriers a combined data signal representing said at least one data signal; means responsive to a respective orthogonal code sequence for producing from the demodulated signals for the plurality of carriers, in dependence upon the reference signal, a composite reference signal representing characteristics of the plurality of carriers; and means for deriving a received data signal from the combined data signal and the composite reference signal.

The means for deriving the received data signal can comprise means for multiplying the combined data signal by the complex conjugate of the composite reference signal. The means for demodulating signals can be arranged to demodulate the signals of the plurality of carriers to produce a demodulated signal which is common to the data and reference signals for the plurality of carriers. The receiver can further comprise: means for deriving a received signal individually for each of the plurality of carriers from a signal representing said at least one data signal received for the respective carrier and a signal representing the reference signal received for the respective carrier; means for combining the received signals for the plurality of carriers to produce a second received data signal; and means for selecting an output signal from the received data signal and the second received data signal.

The invention further provides a CDMA receiver comprising: at least one demodulator for demodulating signals of a plurality of carriers each of which serves to communicate a reference signal and at least one data signal using respective orthogonal code sequences; at least one correlator responsive to a respective orthogonal code sequence and to the demodulated signals for the plurality of carriers for producing a combined data signal representing said at least one data signal; at least one correlator responsive to a respective orthogonal code sequence and to the demodulated signals for the plurality of carriers for producing, in dependence upon the reference signal, a composite reference signal representing characteristics of the plurality of carriers; and a circuit for deriving a received data signal from the combined data signal and the composite reference signal.

The circuit for deriving the received data signal can comprise a multiplier for multiplying the combined data signal by the complex conjugate of the composite reference signal. The at least one demodulator can be arranged to demodulate the signals of the plurality of carriers to produce a demodulated signal which is common to the data and reference signals for the plurality of carriers. The receiver can further comprise: correlators for deriving received signals individually for each of the plurality of carriers for said at least one data signal; a signal combiner for combining the received signals for the plurality of carriers to produce a second received data signal; and a selector for selecting an output signal from the received data signal and the second received data signal.

Another aspect of this invention provides a transmitter for a multi-carrier CDMA (code division multiple access) communications system, comprising: means for producing a signal for transmission, the signal for transmission comprising a plurality of signals spread by respective orthogonal code sequences and a CDMA spreading code; and a filter and modulator for filtering and modulating, in common onto a plurality of carrier frequencies, the signal for transmission. In an embodiment of the transmitter described below there are three equally spaced carrier frequencies, and the modulator is arranged to multiply the signal for transmission after filtering by the filter by a function dependent upon $(1+2\cos(\Delta\omega t))$, where $\Delta\omega$ is the carrier frequency spacing and t represents time.

A further aspect of the invention provides a method of modulating signals for transmission in a multi-carrier CDMA (code division multiple access) communications system, comprising the steps of filtering a spread signal for transmission and modulating the filtered signal in common onto a plurality of carrier frequencies.

Various features and elements as discussed above and described below can be combined in different manners to suit particular circumstances.

BRIEF DESCRIPTION OF THE DRAWINGS

The invention will be further understood from the following description with reference to the accompanying drawings, in which.

DETAILED DESCRIPTION

Figure 1:
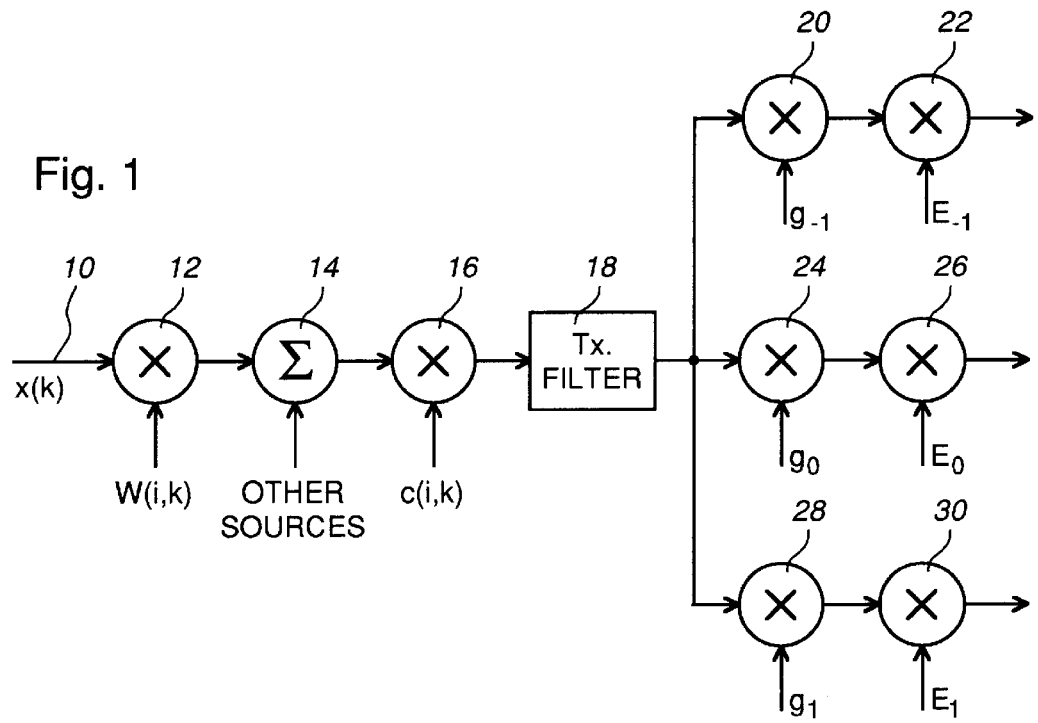
FIG. 1 illustrates a block diagram of a multi-carrier CDMA transmitter.

Referring to FIG. 1, a block diagram illustrates in a general manner a transmitter of a multi-carrier simulcast CDMA communications system. Incoming information on a line 10, represented by complex signal data samples x(k) which can comprise a coded or uncoded data stream, is spread by a respective one of a plurality of orthogonal Walsh code sequences W(i,k) in a complex signal multiplier 12; i and k are integers, i being the Walsh chip index and k being the bit index. The resulting chip sequence is combined with similarly produced chip sequences from other information sources in a signal combiner 14, the output of which is spread by a random or pseudo noise sequence c(i,k) in another complex signal multiplier 16. If the spreading gain is G, then there are G chips per bit and the chip duration $T_c$ is equal to the bit duration $T_b$ divided by G. It can be appreciated that although Walsh code sequences are referred to specifically in this description, this is by way of example and the invention is also applicable to other orthogonal code sequences.

The arrangement illustrated in FIG. 1 uses the same random sequence c(i,k) for spreading all of the information sources. Alternatively, the signal combiner 14 can be positioned after an individual multiplier 16, for spreading by individual random sequences, for each information source. The information sources include a pilot signal, also referred to herein as a reference signal, which is discussed below.

The resulting signal is pulse shaped in a transmit (Tx.) filter 18 and supplied to a plurality of modulators, one for each of the multiple carriers. By way of example the following description and the drawings relate to three equally spaced carrier frequencies, but any plural number of carriers can be provided. Each modulator provides a gain multiplier 20, 24, or 28, providing a gain of $g_{-1}$, $g_0$, or $g_1$ respectively, and a subsequent modulation function 22, 26, or 30 respectively, supplied with carrier signals $E_{-1}$, $E_0$, and $E_1$ respectively. The carrier signals are defined by the equations:

$$E_{-1}=e^{j((\omega_c-\Delta\omega)t+\phi)}$$

$$E_0=e^{j(\omega_c t+\phi)}$$

$$E_1=e^{j((\omega_c+\Delta\omega)t+\phi)}$$

where $\omega_c$ is the angular frequency of the centre one of the three carriers, $\Delta\omega$ is the angular frequency separation between adjacent carriers, $\phi$ is a random phase offset, and t is time.

The resulting multi-carrier signal s(t) for transmission can be expressed as:

$$s(t)=\sum_{k=-\infty}^{\infty}\sum_{i=1}^{G}x(k)c(i,k)W(i,k)h(t-iT_c-kT_b)\sum_{m=-1}^{1}g_m e^{j((\omega_c+m\Delta\omega)t+\phi)}$$

where h(t) is the pulse shaping waveform provided by the transmit filter 18.

Figure 2:
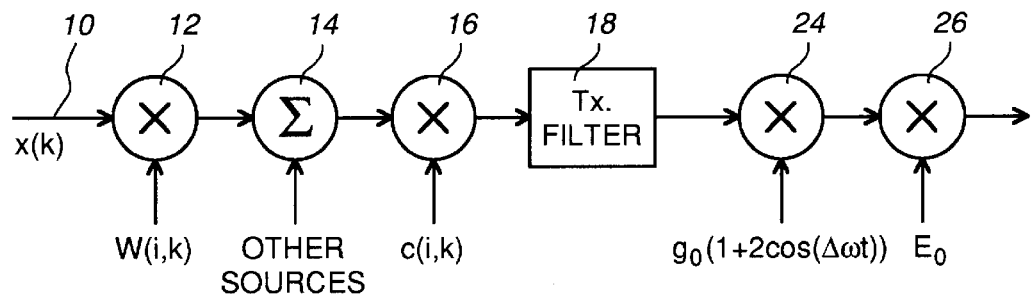
FIG. 2 illustrates a modified form of the transmitter of FIG. 1.
Figure 3:
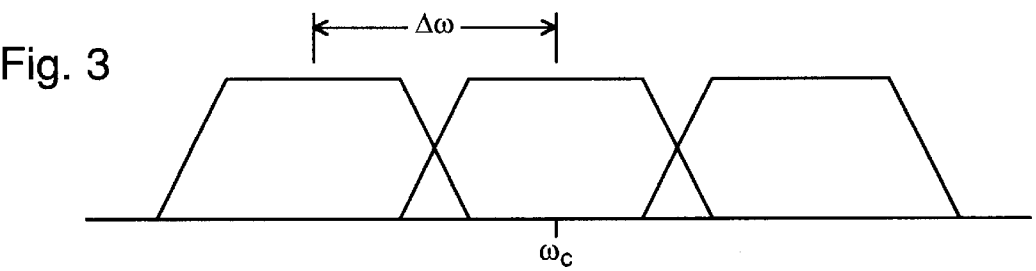
FIG. 3 illustrates a frequency spectrum of a multi-carrier transmitted signal.

The separate gains $g_m$ for the three carriers (m=−1, 0, and 1 respectively) enable power control to be applied individually to each carrier. If the gains are the same for all three carriers, then the transmitter can be simplified to the form illustrated in FIG. 2, in which the complex signal multipliers 24 and 26 provide the modulation functions with an input of $g_0(1+2\cos(\Delta\omega t))$ to the multiplier 24. The transmit filter 18 is also the same for all of the multiple carriers. The magnitude response at the output of the transmitter is as illustrated in FIG. 3, which shows the multi-carrier frequency spectrum with the centre frequency $\omega_c$ and the frequency separation $\Delta\omega$ between adjacent carriers, preferably chosen so that the responses intersect at their 3 dB points in the transition bands of the magnitude response.

Figure 4:
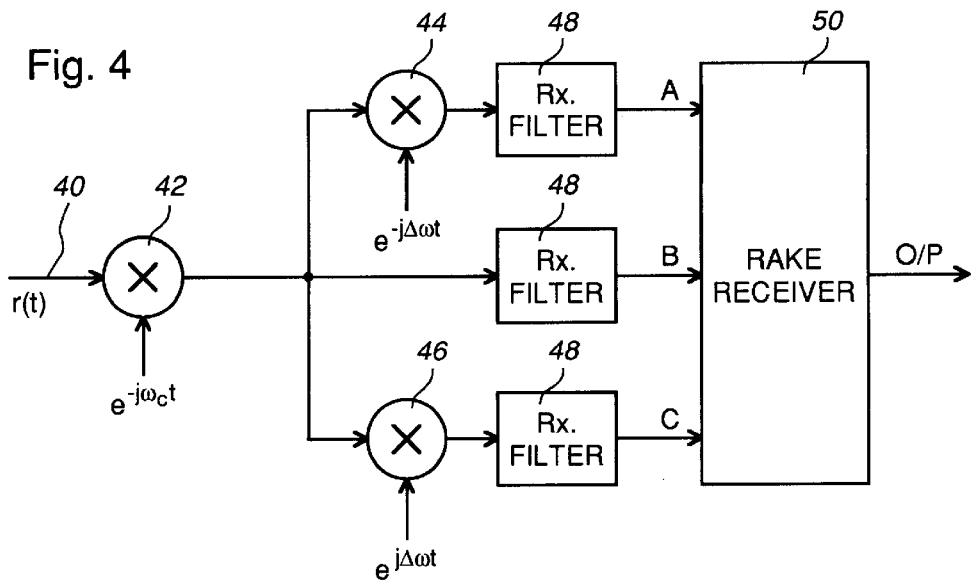
FIG. 4 illustrates a block diagram of a multi-carrier CDMA receiver.
Figure 5:
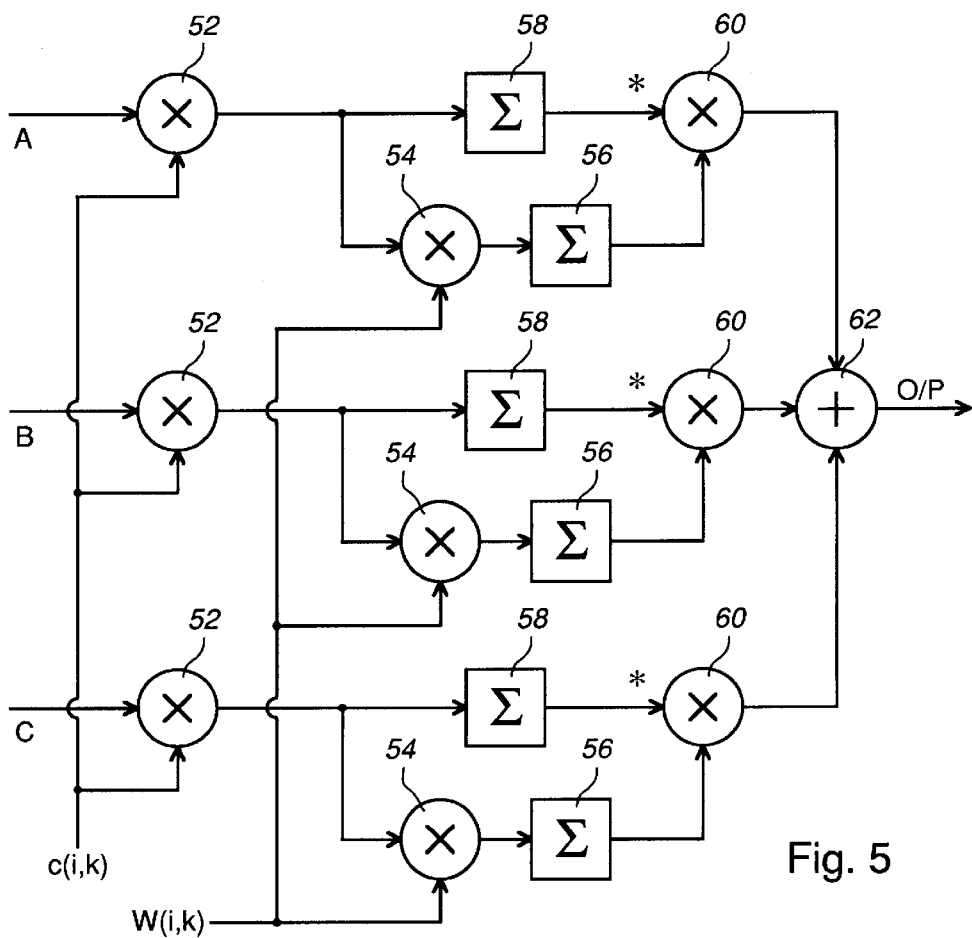
FIG. 5 illustrates a block diagram of an arrangement of one finger of a RAKE receiver of the CDMA receiver of FIG. 4.

FIG. 4 illustrates a multi-carrier simulcast CDMA receiver of the communications system, including a RAKE receiver one finger of which is illustrated in FIG. 5.

Referring to FIG. 4, a received signal r(t) incoming on a line 40 is converted to baseband for the centre frequency $\omega_c$ of the middle carrier frequency by a complex signal multiplier 42, and for the other carrier frequencies also by complex signal multipliers 44 and 46, and the resulting signals are filtered by respective receive (Rx.) filters 48 to produce respective multi-carrier signals A, B, and C which are supplied to a RAKE receiver 50. An output of the RAKE receiver 50 comprises received data samples that may be supplied to further elements in the data detection chain in known manner.

The RAKE receiver 50 can have an arbitrary number of fingers as is known. One finger of the receiver is illustrated in FIG. 5 and comprises, for each of the three signals A, B, and C, a respective path comprising complex signal multipliers 52, 54, and 60 and integrators 56 and 58. The outputs of the multipliers 60 are summed by a summing unit 62 to produce the output signal for the respective finger of the RAKE receiver.

In the path for each of the multi-carrier signals A, B, and C, the multiplier 52 is supplied with the random sequence c(i,k) to perform despreading of the respective signal supplied thereto, and the resulting signal is supplied to the multiplier 54 and to the integrator 58. The multiplier 54 is also supplied with the respective Walsh code sequence W(i,k) to perform despreading, and its output is supplied to the integrator 56 which provides a data integration function. The output of the integrator 56 is a desired data signal which is impaired by characteristics of the communications channel. To compensate for these characteristics, this output is multiplied in the multiplier 60 by the complex conjugate (represented by *) of a channel estimate produced in known manner by the integrator 58 from the pilot or reference signal referred to above. The output of the multiplier 60 consequently constitutes a desired data signal, after correction of the estimated channel impairments, for the respective multi-carrier channel. It can be appreciated that the units 54 and 56 constitute a data correlator for the data signal identified by the respective Walsh code sequence W(i,k), and the unit 58 constitutes a correlator for the pilot or reference signal also identified by its predetermined Walsh code sequence which in this case is the all ones sequence.

A disadvantage of the receiver described above is that it provides no more multi-path resolution as a result of its multiple carriers than is available with a single carrier having the same bandwidth as one of the multiple carriers. This disadvantage is avoided by the arrangements in accordance with embodiments of this invention as described below.

Figure 6:
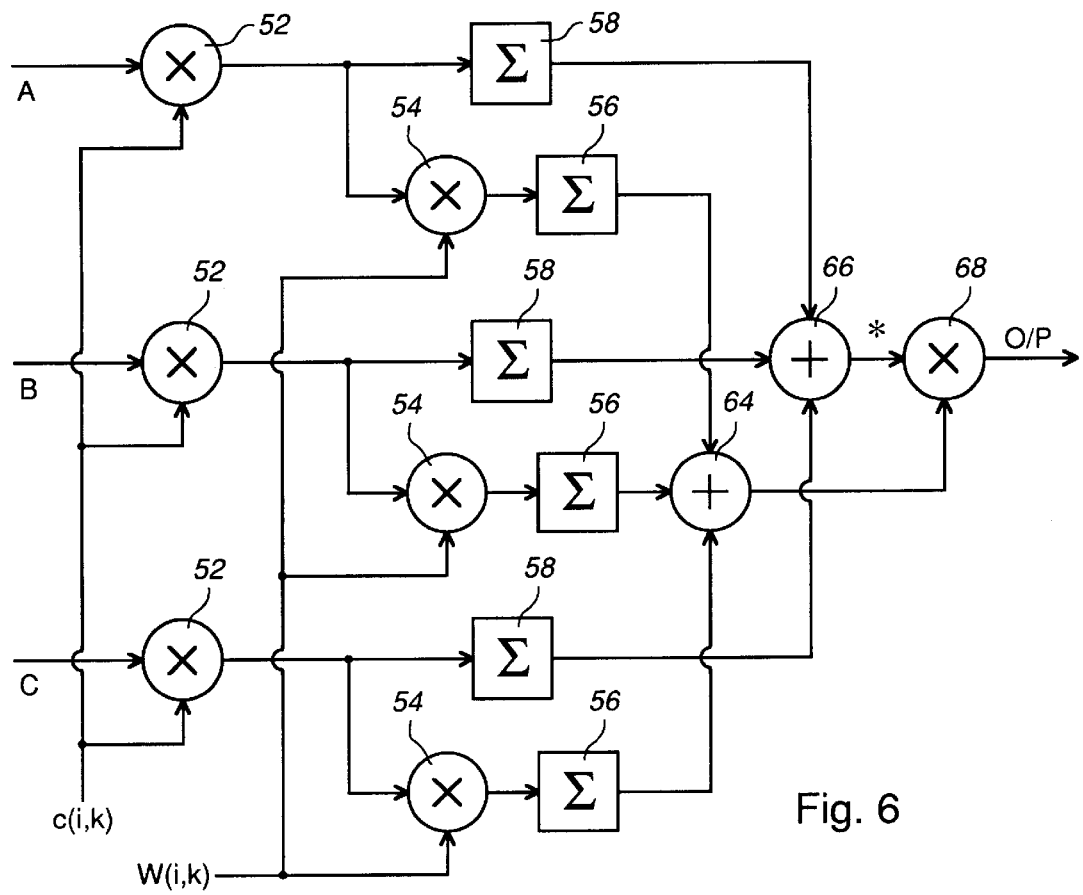
FIG. 6 illustrates a block diagram of an arrangement of one finger of a RAKE receiver in accordance with an embodiment of this invention.

Referring to FIG. 6, one finger of a RAKE receiver in accordance with an embodiment of this invention is illustrated in a similar manner to that of FIG. 5, and accordingly similar references are used to denote corresponding elements. Thus in FIG. 6 the elements 52, 54, 56, and 58 are arranged in the same manner as described above and illustrated in FIG. 5. However, the elements 60 and 62 in FIG. 5 are replaced in the arrangement of FIG. 6 by two complex signal summing units 64 and 66 and one complex signal multiplier 68.

More specifically, in the finger arrangement of FIG. 6 the data signals from the integrators 56 for the three multi-carrier paths are supplied to the summing unit 64 and are combined to produce a combined data signal which is supplied to the multiplier 68, and the pilot signal phase estimates produced by the integrators 58, constituting channel estimates for the three multi-carrier paths, are supplied to the summing unit 66 and are combined to produce a resulting composite reference signal constituting a channel estimate which is supplied to the multiplier 68. The multiplier 68 multiplies the combined data signal by the complex conjugate of the channel estimate to produce the resulting data output signal, for the respective finger of the RAKE receiver.

Thus in the arrangement of FIG. 6 all of the carriers contribute to the pilot signal phase estimate that is used to correct for the channel characteristics, and all of the multiple carriers contribute to the determination of the data signal. This provides a higher multi-path resolution than in the arrangement of FIG. 5, enabling the benefits of frequency diversity in the multi-carrier system to be more fully realized. The higher resolution can be appreciated in that, for example for the three carrier system described here, the RAKE receiver can resolve multi-path components separated by $T_c/3$, compared with a minimum resolution of $T_c$ for the arrangement of FIG. 5.

The arrangement of FIG. 6 shows the RAKE finger operations being performed on the three paths for the respective carriers. Because these are linear operations, and assuming that the same Walsh code is used for all of the multiple carriers as illustrated, then the arrangements of FIGS. 4 and 6 can be combined and rearranged to form a CDMA receiver arrangement as illustrated, for one finger of the RAKE receiver, in FIG. 7.

Figure 7:
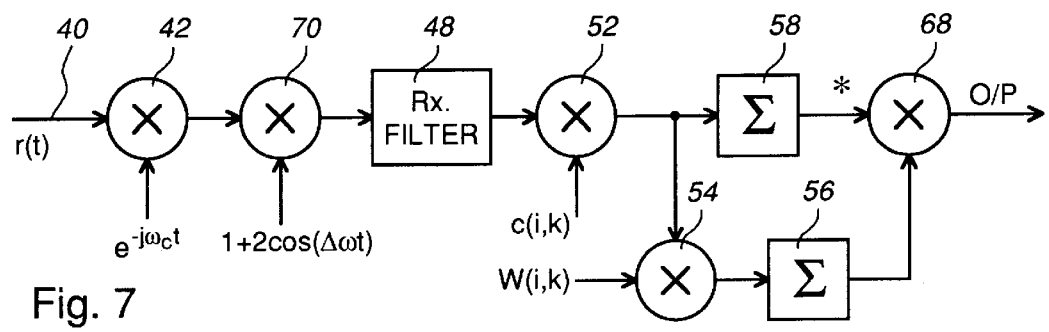
FIG. 7 illustrates an alternative multi-carrier CDMA receiver, showing one finger of a RAKE receiver, in accordance with another embodiment of this invention.

As illustrated in FIG. 7, the received signal r(t) on the line 40 is converted to baseband for the three carriers by the complex signal multiplier 42 and a subsequent complex signal multiplier 70 which is supplied with a signal $1+2\cos(\Delta\omega t)$, the resulting signal being filtered by the receive filter 48 and being processed in common for the three carriers by the elements 52, 54, 56, 58, and 68 for the respective finger of the RAKE receiver. It can be appreciated that this considerably reduces the complexity of the receiver arrangement, because only one set of operations is carried out for the data correlation and pilot signal phase or channel estimation. In this receiver arrangement the complex signal multiplier 70 serves, by virtue of its summed multiplier signal $1+2\cos(\Delta\omega t)$, for combining the received data signals for the multiple carriers so that the combined data signal is produced at the output of the integrator 56, and also for combining the received pilot signal (associated with an individual Walsh code sequence) for the multiple carriers so that the composite reference signal representing the channel estimate is produced at the output of the integrator 58.

It is observed that, although the receiver arrangements described above have the potential to provide three times the multi-path resolution of a single carrier system or of a multi-carrier receiver arrangement as described with reference to FIGS. 4 and 5, operations are not carried out at three times the rate for a single carrier system, because the chip duration is still $T_c$. In contrast, operations in a direct spread CDMA system with comparable bandwidth would have to be performed at a higher rate.

It is also possible, however, for the channel characteristics to be such that the lower resolution receiver arrangement of FIGS. 4 and 5 may provide better results than the higher resolution receiver arrangement of FIGS. 4 and 6 or FIG. 7. In order to obtain optimum results regardless of the channel characteristics, the two receiver arrangements may be combined in an arrangement for example as illustrated in FIG. 8.

Figure 8:
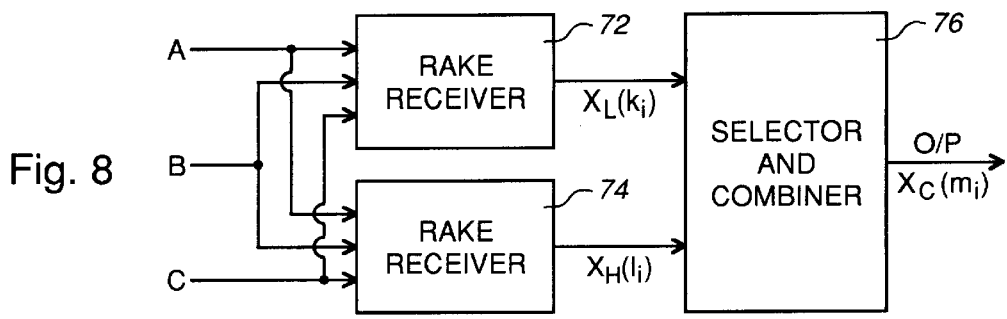
FIG. 8 illustrates a combining arrangement using a CDMA receiver arrangement in accordance with an embodiment of this invention.

Referring to FIG. 8, the arrangement comprises two RAKE receivers 72 and 74 each having $i_{max}$ fingers and being supplied with the multi-carrier signals A, B, and C produced as described above with reference to FIG. 4. The RAKE receiver 72 is a lower resolution receiver each finger of which has the form shown in FIG. 5, producing at its output a set of values $X_L(k_i)$ where $k_i$ represents the time index associated with the i-th RAKE finger such that $k_{i+1} - k_i \geq T_c$. The RAKE receiver 74 is a higher resolution receiver each finger of which has the form of FIG. 6, producing at its output a set of values $X_H(l_i)$ where $l_i$ represents the time index associated with the i-th RAKE finger such that $l_{i+1} - l_i \geq T_c/3$. It is observed that in this case the arrangement of FIG. 6 is preferred to that of FIG. 7 for similarity between, and hence ease of implementation of, the two receivers 72 and 74 which then differ only in the manner in which the pilot signal and data signal outputs of the respective integrators are summed and combined.

The outputs of the RAKE receivers 72 and 74 are supplied to a selector and combiner 76, which serves to choose as the output of the receiver arrangement a set of $i_{max}$ values $X_c(m_i)$ from the union of the two sets $\{X_L(k_i)\}$ and $\{X_H(l_i)\}$ such that $$\sum_{i=1}^{i_{max}} X_C(m_i)$$

is maximized and $m_{i+1} - m_i \geq T_c$ if $X_C(m_{i+1})$ is an element of $\{X_L(k_i)\}$ and $X_C(m_i)$ is an element of $\{X_H(l_i)\}$ or if $X_c(m_{i+1})$ is an element of $\{X_H(l_i)\}$ and $X_c(m_i)$ is an element of $\{X_L(k_i)\}$.

It can be appreciated that the functions of the CDMA receivers described above can be conveniently implemented in various ways, for example in one or more DSP (digital signal processor) integrated circuits or in hardware such as one or more ASICs (application specific integrated circuits).

Although embodiments of the invention have been described above in relation to a multi-carrier system using three carriers, it can be appreciated that the invention can be applied regardless of the specific number of carriers which are used. For example, in a system using five equally spaced carriers instead of three, the receiver arrangement of FIG. 7 can be used with the complex signal multiplier 70 being supplied with a signal $1+2\cos(\Delta\omega t)+2\cos(2\Delta\omega t)$ instead of $1+2\cos(\Delta\omega t)$ as described above. Other complex signal multiplier signals can be used for other multiple carriers, regardless of whether the number of carriers is even or odd and regardless of whether or not the carriers are equally spaced.

Numerous other modifications, variations, and adaptations may be made to the described embodiments without departing from the scope of the invention as defined in the claims.

What is claimed is:

1. A method of combining signals in a receiver of a CDMA (code division multiple access) communications system in which signals for each of a plurality of carriers of the system are combined, comprising the steps of:
   combining signals representing data received for the plurality of carriers to produce a combined data signal;
   combining signals representing a reference signal received for the plurality of carriers to produce a composite reference signal representing characteristics of the plurality of carriers; and
   deriving a received data signal from the combined data signal and the composite reference signal;
   wherein the steps of combining signals representing data and combining signals representing a reference signal for the plurality of carriers are carried out commonly before subsequent steps of despreading using a common code for the plurality of carriers and separating the data and reference signals using respective orthogonal code sequences.

2. A method as claimed in claim 1 wherein the step of deriving the received data signal comprises multiplying the combined data signal by the complex conjugate of the composite reference signal.

3. A method of combining signals in a receiver of a CDMA (code division multiple access) communications system in which signals for each of a plurality of carriers of the system are combined, comprising the steps of:
   combining signals representing data received for the plurality of carriers to produce a combined data signal;
   combining signals representing a reference signal received for the plurality of carriers to produce a composite reference signal representing characteristics of the plurality of carriers; and
   deriving a received data signal from the combined data signal and the composite reference signal;
   wherein the method further comprises the steps of:
   deriving a received signal individually for each of the plurality of carriers from a signal representing data received for the respective carrier and a signal representing the reference signal received for the respective carrier;
   combining the received signals for the plurality of carriers to produce a second received data signal; and
   selecting an output signal from the received data signal and the second received data signal.

4. A CDMA (code division multiple access) receiver comprising:
   means for demodulating signals of a plurality of carriers each of which serves to communicate a reference signal and at least one data signal using respective orthogonal code sequences;
   means responsive to a respective orthogonal code sequence for producing from the demodulated signals for the plurality of carriers a combined data signal representing said at least one data signal;
   means responsive to a respective orthogonal code sequence for producing from the demodulated signals for the plurality of carriers, in dependence upon the reference signal, a composite reference signal representing characteristics of the plurality of carriers; and
   means for deriving a received data signal from the combined data signal and the composite reference signal;
   wherein the means for demodulating signals is arranged to demodulate the signals of the plurality of carriers to produce a demodulated signal which is common to the data and reference signals for the plurality of carriers.

5. A receiver as claimed in claim 4 wherein the means for deriving the received data signal comprises means for multiplying the combined data signal by the complex conjugate of the composite reference signal.

6. A CDMA (code division multiple access) receiver comprising:
   means for demodulating signals of a plurality of carriers each of which serves to communicate a reference signal and at least one data signal using respective orthogonal code sequences;
   means responsive to a respective orthogonal code sequence for producing from the demodulated signals for the plurality of carriers a combined data signal representing said at least one data signal;

means responsive to a respective orthogonal code sequence for producing from the demodulated signals for the plurality of carriers, in dependence upon the reference signal, a composite reference signal representing characteristics of the plurality of carriers; and means for deriving a received data signal from the combined data signal and the composite reference signal;

wherein the receiver further comprises:

means for deriving a received signal individually for each of the plurality of carriers from a signal representing said at least one data signal received for the respective carrier and a signal representing the reference signal received for the respective carrier;

means for combining the received signals for the plurality of carriers to produce a second received data signal; and means for selecting an output signal from the received data signal and the second received data signal.

7. A CDMA (code division multiple access) receiver comprising:

at least one demodulator for demodulating signals of a plurality of carriers each of which serves to communicate a reference signal and at least one data signal using respective orthogonal code sequences;

at least one correlator responsive to a respective orthogonal code sequence and to the demodulated signals for the plurality of carriers for producing a combined data signal representing said at least one data signal;

at least one correlator responsive to a respective orthogonal code sequence and to the demodulated signals for the plurality of carriers for producing, in dependence upon the reference signal, a composite reference signal representing characteristics of the plurality of carriers; and a circuit for deriving a received data signal from the combined data signal and the composite reference signal;

wherein the at least one demodulator is arranged to demodulate the signals of the plurality of carriers to produce a demodulated signal which is common to the data and reference signals for the plurality of carriers.

8. A receiver as claimed in claim 7 wherein the circuit for deriving the received data signal comprises a multiplier for multiplying the combined data signal by the complex conjugate of the composite reference signal.

9. A CDMA (code division multiple access) receiver comprising:

at least one demodulator for demodulating signals of a plurality of carriers each of which serves to communicate a reference signal and at least one data signal using respective orthogonal code sequences;

at least one correlator responsive to a respective orthogonal code sequence and to the demodulated signals for the plurality of carriers for producing a combined data signal representing said at least one data signal;

at least one correlator responsive to a respective orthogonal code sequence and to the demodulated signals for the plurality of carriers for producing, in dependence upon the reference signal, a composite reference signal representing characteristics of the plurality of carriers; and a circuit for deriving a received data signal from the combined data signal and the composite reference signal;

wherein the receiver further comprises:

correlators for deriving received signals individually for each of the plurality of carriers for said at least one data signal;

a signal combiner for combining the received signals for the plurality of carriers to produce a second received data signal; and a selector for selecting an output signal from the received data signal and the second received data signal.

10. A transmitter for a multi-carrier CDMA (code division multiple access) communications system, comprising:

means for producing a signal for transmission, the signal for transmission comprising a plurality of signals spread by respective orthogonal code sequences and a CDMA spreading code; and a filter and modulator for filtering and modulating, in common onto a plurality of carrier frequencies, the signal for transmission;

wherein there are three equally spaced carrier frequencies, and the modulator is arranged to multiply the signal for transmission after filtering by the filter by a function dependent upon $(1+2\cos(\Delta\omega t))$, where $\Delta\omega$ is the carrier frequency spacing and t represents time.

11. A method of modulating signals for transmission in a multi-carrier CDMA (code division multiple access) communications system, comprising the steps of filtering a spread signal for transmission and modulating the filtered signal in common onto a plurality of carrier frequencies, wherein there are three equally spaced carrier frequencies, and the step of modulating the filtered signal in common onto the carrier frequencies comprises multiplying the filtered signal by a function dependent upon $(1+2\cos(\Delta\omega t))$, where $\Delta\omega$ is the carrier frequency spacing and t represents time.

* * * * *